United States Patent Office 2,926,199
Patented Feb. 23, 1960

2,926,199

PREPARATION OF POLYCYCLIC HALOGENATED COMPOUNDS

Louis Schmerling, Riverside, Ill., assignor, by mesne assignments, to Universal Oil Products Company, Des Plaines, Ill., a corporation of Delaware No Drawing. Application February 21, 1957
Serial No. 641,448

11 Claims. (Cl. 260—648)

This application is a continuation-in-part of my copending application Serial No. 413,461, filed March 1, 1954.

This invention relates to a process for preparing polycyclic halogenated compounds and more particularly to a method for preparing tetracyclic compounds containing halogen atoms on only two rings.

An object of this invention is to prepare polycyclic halogenated compounds possessing insecticidal properties.

A further object of this invention is to prepare insecticides consisting of tetracyclic polychlorinated compounds containing the chlorine substituents on only two of the four ring structures of the compound.

One embodiment of this invention resides in a process for the preparation of a halogenated polycyclic compound by reacting a cycloalkadiene with a haloolefin having the general formula:

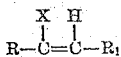

in which R and $R_1$ are independently selected from the group consisting of alkyl, haloalkyl and hydrogen radicals and X is a halogen, condensing the resultant halogenated bicyclic compound with a polyhalocycloalkadiene at a temperature in the range of from about atmospheric to about 250° C. or more to form a halogenated tetracyclic compound, completely dehalogenating one ring of the latter compound by treatment of a hydroxide of a metal selected from the group consisting of alkali and alkaline earth metals, and recovering the desired halogenated polycyclic compound.

A further embodiment of the invention is found in a process for preparing a halogenated polycyclic compound which comprises reacting cyclopentadiene with a haloolefin having the general formula:

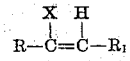

in which R and $R_1$ are independently selected from the group consisting of alkyl, haloalkyl and hydrogen radicals and X is a halogen, condensing the resultant halogenated bicyclic compound with hexachlorocyclopentadiene at a temperature in the range of from about atmospheric to about 250° C. or more to form a halogenated tetracyclic compound, completely dehalogenating one ring of the latter compound by treatment of a hydroxide of a metal selected from the group consisting of alkali and alkaline earth metals at a temperature in the range of from about 0° to about 250° C., and recovering the desired halogenated polycyclic compound.

A specific embodiment of the invention is found in a process for preparing a chlorinated polycyclic compound by reacting cylcopentadiene with vinyl chloride to form 5-chlorobicyclo[2.2.1]-2-heptene, condensing said compound with hexachlorocyclopentadiene at a temperature in the range of from about atmospheric to about 250° C. to form a chlorinated tetracyclic compound, completely dechlorinating one 6-membered carbon atom ring of the compound by treating said compound with an alkaline hydroxide at a temperature in the range of from about 0° to about 250° C., and recovering the resultant 1,2,3,4,10,10 - hexachloro - 1,4,4a,5,8,8a - hexahydro - 1,4,5,8-dimethanonaphthalene.

Other objects and embodiments referring to alternative reactants and to alternative dehalogenating compounds will be referred to in the following further detailed description of the invention.

It has now been discovered that insecticidal compounds comprising polychlorinated tetracyclic compounds such as 1,2,3,4,10,10-hexachloro-1,4,4a,5,8,8a-hexahydro-1,4,5,8-dimethanonaphthalene, known in the trade as "Aldrin" as well as alkyl and haloalkyl derivatives thereof, may be prepared by condensing a cycloalkadiene with a monohaloolefin, followed by condensation of the bicyclic reaction product with a polyhalocycloalkadiene, and partially dehalogenating the resultant polyhalo tetracyclic condensation product to yield the desired compound. The term "partial dehalogenation" as used in this specification refers to the complete dehalogenation of one of the tetracyclic rings of the desired product, especially the 6-membered carbon atom ring containing one halogen radical.

The physical properties of the present tetracyclic condensation products and the effects they have on entomological forms of life make them particularly desirable as insecticides and insect repellants, the compounds having many of the properties desired of materials for this purpose. They are, for example, toxic to insects which are destructive of plant life and property normally subject to insect infestation, their toxic effects being manifested by contact of the poison with the insect. The insecticides comprising the present compounds are thus effective against chewing as well as sucking types of insects. The compounds are sufficiently volatile such that when applied to plant life intended for subsequent human consumption, the plant when harvested and after allowing a reasonable time for evaporation of the applied insecticide therefrom retains none of the toxicant to prevent use of the plant for food purposes. On the other hand, the compounds are of sufficiently limited volatility to be retained for the time required to accomplish the toxic effects of the compounds. The volatility and retentive capacity of the compounds may be varied at will by combining them with suitable fixing agents which reduce or promote their volatilization, as desired. Thus, the compounds may be dissolved in a suitable high boiling solvent, such as a mineral or vegetable oil, etc.; a wax, such as paraffin wax, beeswax, etc.; a high molecular weight alcohol or ether such as myricyl alcohol, dibutyl ether, etc.; or they may be emulsified with water or combined with an oil and emulsified with water by the addition of an emulsifying agent, such as a surface active agent, to the mixture of components. The latter solvents and dispersants may also be employed for the specific purpose of reducing the concentration of insecticide to the desired level in a specific insecticidal formulation. The particular formulation of active components in combination with the solvent or dispersant will depend upon its application. Compositions containing as high as 20% of active component may be preferred in some instances where deep penetration of the insecticide is desired, as in the treatment of fibrous material such as wood, for extinction of a particular infestation, such as wood termites. For other purposes, the required concentration of active components in the formulation may be as low as 0.1%, as for example in the treatment of fabrics for destroying moth larvae. In utilizing the present insecticidal compounds against most insects, a composition containing from about 0.1% to about 5% by weight of the active component is highly effective. The choice of the most desirable solvent or dispersant further depends upon the method utilized to apply the insecticidal composition to the infested article. For example, a low molecular weight, normally gaseous carrying agent for the active insecticidal component, such as butane, the Freons, etc. may be compressed and liquefied into a small bomb containing the insecticide. Upon release of pressure from the bomb, the liquefied carrier vaporizes and suspends a quantity of the active component therein, thus providing a convenient spraying method of applying the insecticide. The active component may also be dissolved in a liquid carrier such as kerosene, and alcohol, etc., and the resulting solution atomized by a suitable spraying device.

The intermediate halogenated bicyclic compounds which are used for the preparation of the final products of the present invention may be prepared by the condensation of a cycloalkadiene with a haloolefin having the formula:

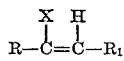

in which R and $R_1$ are independently selected from the group consisting of alkyl, haloalkyl and hydrogen radicals and X is the halogen radical. Examples of cycloalkadienes which may be used include conjugated cycloalkadienes such as 1,3-cyclopentadiene (hereinafter referred to as cyclopentadiene), and 1,3-cyclohexadiene, or alkyl derivatives thereof such as 1-methylcyclopentadiene,
1-ethylcyclopentadiene,
1-propylcyclopentadiene,
5-methylcyclopentadiene,
5-ethylcyclopentadiene,
1,4-dimethylcyclopentadiene,
1,4-diethylcyclopentadiene,
5,5-dimethylcyclopentadiene,
1-methyl-2-ethylcyclopentadiene,
1-methyl-4-ethylcyclopentadiene, etc.,
1-methyl-1,3-cyclohexadiene,
1-ethyl-1,3-cyclohexadiene,
5-methyl-1,3-cyclohexadiene,
5-ethyl-1,3-cyclohexadiene,
1,2-dimethyl-1,3-cyclohexadiene,
1,2-diethyl-1,3-cyclohexadiene,
1,4-dimethyl-1,3-cyclohexadiene,
1,4-diethyl-1,3-cyclohexadiene,
5,6-dimethyl-1,3-cyclohexadiene,
5,6-diethyl-1,3-cyclohexadiene,
1-methyl-2-ethyl-1,3-cyclohexadiene,
1-methyl-4-ethyl-1,3-cyclohexadiene, etc.

Cyclopentadiene is the preferred reactant of the present invention due to its relatively greater availability and because it yields a preferred type of bicycloalkadiene, namely, a bicyclo[2.2.1]-2-heptene.

The haloolefins which are used in the process of this invention comprise haloalkenes in which the halogen, preferably chlorine or bromine (i.e., halogens having an atomic weight between 35 and 80) is attached to one of the doubly bonded carbon atoms and include vinyl chloride, vinyl bromide, 1-chloro-1-propene, 1-bromo-1-propene, 2-chloro-1-propene, 2-bromo-1-propene, 1-chloro-1-butene, 1-bromo-1-butene, 2-chloro-1-butene, 2-bromo-1-butene, 2-chloro-2-butene, 2-bromo-2-butene, 1-chloro-1-pentene, 2-chloro-1-pentene, 2-chloro-2-pentene, 3-chloro-2-pentene, 1-bromo-1-pentene, 2-bromo-1-pentene, 3-bromo-2-pentene, 2-chloro-3-methyl-2-butene, 2-bromo-3-methyl-2-butene, 2-chloro-3-methyl-2-pentene, 2-bromo-3-methyl-2-pentene, etc. Examples of haloalkenes in which there is a halogen on a saturated carbon atom as well as on a doubly bonded carbon atom (those compounds in which one of the radicals, R or $R_1$ is a haloalkyl radical) include 1,3-dichloro-1-propene,
2,3-dichloro-1-propene,
1,3,3-trichloro-1-propene,
1,3,3,3-tetrachloro-1-propene,
1,4-dichloro-1-butene,
2,4-dichloro-2-butene,
1,4,4-trichloro-1-butene,
2,4,4-trichloro-2-butene,
1,4,4,4-tetrachloro-1-butene,
2,4,4,4-tetrachloro-2-butene,
1,3-dichloro-2-butene,
1,3-dibromo-1-propene,
2,3-dibromo-1-propene,
1,3,3-tribromo-1-propene,
1,3,3,3-tetrabromo-1-propene,
1,4-dibromo-1-butene,
2,4-dibromo-2-butene,
1,4,4-tribromo-1-butene,
2,4,4-tribromo-2-butene,
1,4,4,4-tetrabromo-1-butene,
2,4,4,4-tetrabromo-2-butene,
1,3-dibromo-2-butene, etc.,
1-chloro-3-fluoro-1-propene,
1-chloro-3,3-difluoro-1-propene,
1-chloro-3,3,3-trifluoro-1-propene,
1-bromo-3-fluoro-1-propene,
1-bromo-3,3-difluoro-1-propene,
1-bromo-3,3,3-trifluoro-1-propene,
1-chloro-4-fluoro-1-butene,
1-chloro-4,4-difluoro-1-butene,
1-chloro-4,4,4-trifluoro-1-butene,
1-bromo-4-fluoro-1-butene,
1-bromo-4,4-difluoro-1-butene,
1-bromo-4,4,4-trifluoro-1-butene, etc.

It is to be understood that the above enumerated alkadienes and haloolefins are only representative of the class of compounds which may be used, and that the present invention is not necessarily limited thereto.

The process for the preparation of the halogenated bicyclic alkene is effected by the thermal condensation of the cycloalkadiene with the haloolefin having the aforementioned formula, preferably at a pressure sufficient to maintain at least one of the reactants in a substantially liquid phase. This condensation reaction, generally characterized as one of the Diels-Alder type, is effected at a temperature in the range of from about atmospheric to about 250° C. or higher, preferably at a temperature of from about 150° to about 200° C. Use of superatmospheric pressures, generally in excess of about two atmospheres and preferably from about 10 to about 100 atmospheres may be an advantage to maintain substantially liquid phase conditions. In order to provide such pressure within the reaction vessel, a suitable inert gas such as nitrogen, carbon dioxide, etc., may be charged to the reaction vessel at the desired pressure and the reaction mixture heated at such pressure until the optimum degree of condensation has occurred.

Although the use of approximately equimolecular ratios of the reactants generally results in a substantial yield of the desired condensation product, it is usually preferred to maintain a stoichiometric excess of the haloolefinic component in the reaction mixture of from about 1.5 to 1 to about 10 to 1 molecular proportions of the haloolefin to the cycloalkadiene reactant in order to consume the latter component substantially to completion during the reaction. In thus substantially removing the cycloalkadiene component from the reaction mixture by virtue of its substantially complete condensation with the haloolefinic reactant, the subsequent problem of separating the product from the reaction mixture is simplified, since the excess of haloolefin, usually the component of the reaction mixture having the lowest boiling point, may be removed therefrom merely by distilling the same from the mixture, leaving the halogenated bicyclic compound as the desired condensation product. The latter residue may be thereafter purified, for example, by fractional distillation, crystallization, extraction or by other means well known in the art, or utilized directly without further treatment for the preparation of the desired tetracyclic compound which is the ultimate product of the present invention.

The condensation of a conjugated cyclopentadiene with a haloolefin of the type hereinbefore set forth yields a halobicyclo[2.2.1]-2-heptene, while the condensation of a conjugated cyclohexadiene with a haloolefin yields a halobicyclo[2.2.2]-2-octene. The aforementioned halobicyclo[2.2.1]-2-heptene or halobicyclo[2.2.2]-2-octene may then be condensed with polyhalocycloalkadienes such as polyhalo-1,3-cyclopentadienes, hereinafter referred to as polyhalocyclopentadienes, including 1,2-dichlorocyclopentadiene,
1,2,3-trichlorocyclopentadiene,
1,2,3,4-tetrachlorocyclopentadiene,
1,2,3,4,5-pentachlorocyclopentadiene,
hexachlorocyclopentadiene;
1,2,3,4,-tetrachloro-1,3-cyclohexadiene,
1,2,3,4,5-pentachloro-1,3-cyclohexadiene,
octachloro-1,3-cyclohexadiene, etc., to form polyhalotetracyclic compounds which are then partially dehalogenated to form compounds in which one of the 6-membered carbon atom rings is halogen free.

The operating conditions of the condensation reaction between the polyhalocycloalkadiene and the hereinbefore mentioned condensation product of the cycloalkadiene and the haloolefin is also dependent upon the particular compounds employed in the reaction. This condensation reaction may be carried out at temperatures in the range of from about atmospheric to about 250° C. or more, and preferably in a range of from about 100° to about 180° C. and, at a pressure sufficient to maintain at least one of the reactants in a substantially liquid phase. In addition, it is often preferred to carry out the condensation of the polyhalocycloalkadiene and the halogenated bicyclic compound in the presence of a diluent, for example, an inert hydrocarbon including aromatic hydrocarbons such as, for example, benzene, toluene, the xylenes, etc.; a paraffinic hydrocarbon such as n-pentane, n-hexane, etc.; or an alcohol such as methyl alcohol, ethyl alcohol, propyl alcohol, etc.

The partial dehalogenation of the tetracyclic compound in which the halogen atom on one of the 6-membered carbon atom rings is removed is effected by treating the tetracyclic compound with a dehalogenating agent. For purposes of this invention the term "dehalogenation" refers to a dehydrohalogenation whereby a hydrogen atom on a carbon atom adjacent the carbon atom containing the halogen atom is removed in the process whereby forming an unsaturated linkage. Dehalogenating agents which may be used include the hydroxides of the alkali metals and alkaline earth metals such as calcium hydroxide, magnesium hydroxide, barium hydroxide, strontium hydroxide, lithium hydroxide, rubidium hydroxide, sodium hydroxide, potassium hydroxide, cesium hydroxide, etc. The alkali metal or alkaline earth metal hydroxide is preferably used in an alcoholic solution, alcohols such as methyl alcohol, ethyl alcohol, n-propyl alcohol, isopropyl alcohol, n-butyl alcohol, isobutyl alcohol, n-amyl alcohol, etc., being utilized therefor. It is also contemplated within the scope of this invention that sodamide in an ammoniacal solution may also be used as a dehalogenating agent.

The operating conditions of the dehalogenation step of the present process will occur at a temperature depending upon the particular reactant and the solvent which is used as a medium for the reaction. Suitable temperatures will usually lie within the range of from about 0° to about 250° C. or more, the preferred range being from about 35° to about 200° C. In the event that the reaction temperature which is employed exceeds the boiling point of the alcohol in which the alkali metal or alkaline earth metal hydroxide is used superatmospheric pressures are employed in order to maintain the reaction mixture in a substantially liquid phase.

The process of this invention may be effected in any suitable manner and may comprise either a batch or a continuous type operation. When a batch type operation is used, a quantity of the starting materials, namely, the cycloalkadiene and the haloolefin as well as a diluent if so desired are placed in a reactor equipped with a mixing and heating device, after which the reactor is heated to the desired temperature while thoroughly admixing the contents thereof. After a suitable period has elapsed, the reactor and contents thereof are cooled to room temperature and the desired products are thereafter recovered by suitable means, for example, by fractional distillation, etc., while the unreacted feed stock may be recharged to the next batch. The desired product may then be placed in the same reactor or, if so desired, a second reactor, and the polyhalocycloalkadiene and diluent, if one is used, charged thereto. The reactor is then heated to the desired temperature until the reaction is completed, after which the polyhalotetracycloalkene is separated by suitable means, such as by washing with water, fractional distillation and crystallization. The desired polyhalotetracycloalkene may then be placed in the same reactor or in still a third reactor and the particular dehalogenating agent previously selected is then added thereto. This reactor is also heated to the desired temperature until the reaction is completed, after which the partially dehalogenated polyhalotetracycloalkadiene is separated from the unreacted materials by the same means hereinbefore set forth.

Another method of operation of the present process is of the continuous type. In one type of operation, the reactants are continuously charged to a suitable reactor maintained at the desired operating conditions of temperature and pressure. This reactor may comprise an unlined vessel or coil, or may be lined with an adsorbent packing material such as alumina, fire brick, dehydrated bauxite and the like. The starting materials may be charged to the reactor through separate means or, if so desired, may be admixed prior to entry into said reactor and charged thereto in a single line. The desired halogenated bicyclic compound is continuously withdrawn from the reactor by suitable means, separated from the reactor effluent and continuously charged into a second reactor also maintained at the proper operating conditions of temperature and pressure. The unreacted feed stock from the first reactor, comprising the cycloalkadiene and the haloolefin, which has been separated from the halobicycloalkene before the latter was charged to the second reactor may be recycled for use as part of the fresh feed stock. In the second reactor the halogenated bicyclic compound is mixed with a polyhalocycloalkadiene, which is also continuously charged to the second reactor, where the reaction resulting in the preparation of the polyhalotetracycloalkene occurs. The latter compound is continuously withdrawn from the second reactor, separated from any unreacted polyhalocycloalkadiene and halobicycloalkene and charged to a third reactor also maintained at the proper operating conditions of temperature and pressure. As was in the case of the reactor effluent from the first reactor, the unreacted polyhalocycloalkadiene and halobicycloalkene may be recharged to the second reactor to form a portion of the fresh feed stock thereto. The polyhalotetracycloalkene which is continuously charged to the third reactor undergoes dehalogenation therein by treatment with the dehalogenating agent previously mentioned. The partially dehalogenated compound, comprising a polyhalotetracycloalkadiene in which one 6-membered carbon atom ring is completely free of halogen atoms is continuously withdrawn from the third reactor, separated from the dehalogenating agent, solvent and unreacted polyhalotetracycloalkene and purified by conventional means, while the unreacted material may be recycled to form a part of the feed stock charged to the third reactor.

The following examples are given to illustrate the process of this invention which, however, are not intended to limit the generally broad scope of the present invention in strict accordance therewith.

*Example I*

Sixty grams of cyclopentadiene and 175 g. of vinyl bromide are placed in a rotating autoclave and heated at a temperature of approximately 108–200° C. for 5 hours. The autoclave and contents thereof are then cooled to room temperature and the reaction product is subjected to fractional distillation under reduced pressure. 5-bromobicyclo [2.2.1]-2-heptene boiling at 67–68° C. at 21 mm. pressure (170–171° C. at 760 mm. pressure) is obtained in 63% yield.

A solution of 9 g. of the bromobicycloheptene and 13 g. of hexachlorocyclopentadiene in 15 g. of toluene is heated under reflux at 127° C. for about 10 hours. At the end of this time the reactor and contents thereof are cooled to room temperature and subjected to fractional distillation under reduced pressure to remove toluene and unreacted starting materials. The residue is recrystallized from ethanol yielding 11 g. of pale yellow crystals melting at 174–175° C.

A solution of 10 g. of this crystalline compound and 10 g. of potassium hydroxide in 250 g. of propyl alcohol is heated under reflux for 14 hours. The product is cooled to room temperature, filtered and the filtrate then subjected to vacuum distillation to remove the alcohol. The residue is dissolved in ether to remove the desired product from the excess potassium hydroxide after which the ether solution is then washed, dried and distilled to remove the ether. The residue is recrystallized preferably from ethyl acohol, to yield 1,2,3,4,10,10-hexachloro-1,4,4a,8,8a - hexahydro - 1,4,5,8-dimethanonaphthalene in about 80% yield.

*Example II*

Sixty grams of cyclopentadiene and 175 g. of vinyl chloride are placed in a rotating autoclave and heated at a temperature of approximately 180–200° C. for a period of about 5 hours. At the end of this time the autoclave and contents thereof are cooled to room temperature and the reaction product subjected to fractional distillation under reduced pressure whereby 5-chlorobicyclo [2.2.1]-2-heptene boiling at 53–55° C. at 25 mm. pressure (150–152° C. at 760 mm. pressure) is obtained. A solution of about 12 g. of the chlorobicycloheptene, 28 g. of hexachlorocyclopentadiene and 50 g. of toluene is heated to reflux for about 10 hours. At the end of this time the reactor and contents thereof are cooled to room temperature and the desired reaction product is obtained in a manner similar to that set forth in Example I above.

A solution of 10 g. of the compound obtained thereby and 10 g. of potassium hydroxide in 250 g. of propyl alcohol were placed in a condensation flask and heated under reflux for 15 hours. The reaction product obtained from this dehalogenation step is also treated to a manner similar to that set forth in Example I above. The residue obtained thereby is recrystallized to yield 1,2,3,4,10,10-hexachloro-1,4,4a,8,8a-hexahydro - 1,4,5,8-dimethanonaphthalene.

I claim as my invention:

1. A process for the preparation of a halogenated polycyclic compound from a halogenated tetracyclic compound resulting from the Diels-Alder condensation of a polyhalocycloalkadiene with a halogenated bicyclic compound obtained by the Diels-Alder condensation of a cycloalkadiene with a haloolefin having the general formula:

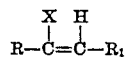

in which R and R₁ are independently selected from the group consisting of alkyl, haloalkyl and hydrogen radicals and X is a hologen, which comprises treating said halogenated tetracyclic compound with a hydroxide of a metal selected from the group consisting of alkali and alkaline earth metals at a temperature in the range of from about 0° to about 250° C., and recovering the desired halogenated polycyclic compound.

2. A process for the preparation of a halogenated polycyclic compound from a halogenated tetracyclic compound resulting from the Diels-Alder condensation of a polyhalocycloalkadiene with a halogenated bicyclic compound obtained by the Diels-Alder condensation of a cycloalkadiene with a haloolefin having the general formula:

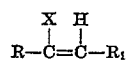

in which R and R₁ are independently selected from the group consisting of alkyl, haloalkyl and hydrogen radicals and X is chlorine, which comprises treating said halogenated tetracyclic compound with a hydroxide of a metal selected from the group consisting of alkali and alkaline earth metals at a temperature in the range of from about 0° to about 250° C., and recovering the resultant halogenated polycyclic compound.

3. A process for the preparation of a halogenated polycyclic compound from a halogenated tetracyclic compound resulting from the Diels-Alder condensation of a polyhalocycloalkadiene with a halogenated bicyclic compound obtained by the Diels-Alder condensation of a cycloalkadiene with a haloolefin having the general formula:

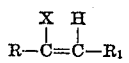

in which R and R₁ are independently selected from the group consisting of alkyl, haloalkyl and hydrogen radicals and X is bromine, which comprises treating said halogenated tetracyclic compound with a hydroxide of a metal selected from the group consisting of alkali and alkaline earth metals at a temperature in the range of from about 0° to about 250° C., and recovering the resultant halogenated polycyclic compound.

4. A process for the preparation of a chlorinated polycyclic compound from a halogenated tetracyclic compound resulting from the Diels-Alder condensation of hexachlorocyclopentadiene with a halogenated bicyclic compound obtained by the Diels-Alder condensation of a cycloalkadiene with a haloolefin having the general formula:

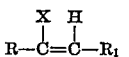

in which R and R₁ are independently selected from the group consisting of alkyl, haloalkyl and hydrogen radicals and X is a halogen, which comprises treating said halogenated tetracyclic compound with a hydroxide of a metal selected from the group consisting of alkali and alkaline earth metals at a temperature in the range of from about 0° to about 250° C., and recovering the desired chlorinated polycyclic compound.

5. A process for the preparation of a chlorinated polycyclic compound from a halogenated tetracyclic compound resulting from the Diels-Alder condensation of hexachlorocyclopentadiene with a halogenated bicyclic compound obtained by the Diels-Alder condensation of cyclopentadiene with a haloolefin having the general formula:

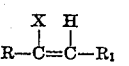

in which R and R₁ are independently selected from the group consisting of alkyl, haloalkyl and hydrogen radicals and X is a halogen, which comprises treating said halogenated tetracyclic compound with a hydroxide of a metal selected from the group consisting of alkali and alkaline earth metals at a temperature in the range of from about 0° to about 250° C., and recovering the desired chlorinated polycyclic compound.

6. A process for the preparation of a chlorinated polycyclic compound from the Diels-Alder condensation product of 5-chlorobicyclo[2.2.1]-2-heptene with hexachlorocyclopentadiene which comprises completely dechlorinating one 6-membered carbon atom ring of said condensation product by treating the same with an alkaline hydroxide at a temperature in the range of from about 0° to about 250° C., and recovering the resultant 1,2,3,4,10,10-hexachloro-1,4,4a,5,8,8a-hexahydro-1,4,5,8-dimethanonaphthalene.

7. A process for the preparation of a chlorinated polycyclic compound from the Diels-Alder condensation product of 5-bromobicyclo[2.2.1]-2-heptene with hexachlorocyclopentadiene which comprises completely debrominating one 6-membered carbon atom ring of said condensation product by treating the same with an alkaline hydroxide at a temperature in the range of from about 0° to about 250° C., and recovering the resultant 1,2,3,4, 10,10 - hexachloro - 1,4,4a,5,8,8a - hexahydro - 1,4,5,8- dimethanonaphthalene.

8. A process for the preparation of a chlorinated polycyclic compound from the Diels-Alder condensation product of 5-chlorobicyclo[2.2.1]-2-heptene with hexachlorocyclopentadiene which comprises completely dechlorinating one 6-membered carbon atom of said condensation product by treating the same with potassium hydroxide at a temperature in the range of from about 0° to about 250° C., and recovering the resultant 1,2,3,4,10,10-hexachloro - 1,4,4a,5,8,8a - hexahydro - 1,4,5,8 - dimethanonaphthalene.

9. A process for the preparation of a chlorinated polycyclic compound from the Diels-Alder condensation product of 5-chlorobicyclo[2.2.1]-2-heptene with hexachlorocyclopentadiene which comprises completely dechlorinating one 6-membered carbon atom of said condensation product by treating the same with sodium hydroxide at a temperature in the range of from about 0° to about 250° C., and recovering the resultant 1,2,3,4,10,10-hexachloro - 1,4,4a,5,8,8a - hexahydro - 1,4,5,8 - dimethanonaphthalene.

10. A process for the preparation of a chlorinated polycyclic compound from Diels-Alder condensation product of 5-bromobicyclo[2.2.1]-2-heptene with hexachlorocyclopentadiene which comprises completely debrominating one 6-membered carbon atom of said condensation product by treating the same with potassium hydroxide at a temperature in the range of from about 0° to about 250° C., and recovering the resultant 1,2,3,4, 10,10 - hexachloro - 1,4,4a,5,8,8a - hexahydro - 1,4,5,8- dimethanonaphthalene.

11. A process for the preparation of a chlorinated polycyclic compound from the Diels-Alder condensation product of 5-bromobicyclo[2.2.1]-2-heptene with hexachlorocyclopentadiene which comprises completely debrominating one 6-membered carbon atom of said condensation product by treating the same with sodium hydroxide at a temperature in the range of from about 0° to about 250° C., and recovering the resultant 1,2,3,4, 10,10 - hexachloro - 1,4,4a,5,8,8a - hexahydro - 1,4,5,8- dimethanonaphthalene.

References Cited in the file of this patent

UNITED STATES PATENTS

| | | |
|---|---|---|
| 2,351,311 | Alder et al. | June 13, 1944 |
| 2,676,132 | Bluestone | Apr. 20, 1954 |

FOREIGN PATENTS

| | | |
|---|---|---|
| 151,645 | Australia | Mar. 3, 1949 |